United States Patent [19]

Mendia et al.

[11] Patent Number: 5,461,856
[45] Date of Patent: Oct. 31, 1995

[54] DIVERGENT SLAVE PETAL FOR SEALING IN VARIABLE GEOMETRY EXHAUST NOZZLES FOR GAS TURBINE PROPULSION UNITS

[75] Inventors: Jose I. I. Mendia, Gorliz; Jose R. Urruela, Las Arenas, both of Spain

[73] Assignee: Sener, Ingenieria Y Sistemas, S.A., Vizcaya, Spain

[21] Appl. No.: 113,228

[22] Filed: Aug. 27, 1993

[30] Foreign Application Priority Data

Oct. 27, 1992 [ES] Spain ................................. 9202157

[51] Int. Cl.⁶ .................................................. F02K 1/12
[52] U.S. Cl. .................... 60/230; 60/271; 239/265.35; 239/265.41
[58] Field of Search ....................... 60/228, 230, 232, 60/271; 239/265.19, 265.35, 265.37, 265.39, 265.41

[56] References Cited

U.S. PATENT DOCUMENTS

| 4,662,566 | 5/1987 | Honeycutt, Jr. . | |
| 4,690,330 | 9/1987 | Robinson et al. . | |
| 4,994,660 | 2/1991 | Hauer | 60/228 |
| 5,000,386 | 3/1991 | Lybarger | 239/265.39 |
| 5,076,496 | 12/1991 | Lippmeier | 239/265.41 |
| 5,174,502 | 12/1992 | Lippmeier | 239/265.41 |
| 5,215,257 | 6/1993 | Bareza . | |
| 5,269,467 | 12/1993 | Williams et al. | 239/265.41 |

FOREIGN PATENT DOCUMENTS

| 2657922 | 2/1991 | France . |
| 2230299 | 12/1989 | United Kingdom . |

Primary Examiner—Richard A. Bertsch
Assistant Examiner—William Wicker
Attorney, Agent, or Firm—Ostrolenk, Faber, Gerb & Soffen

[57] ABSTRACT

A divergent slave petal for sealing in variable geometry exhaust nozzles for gas turbine propulsion units includes a base plate for bearing axial forces but having minimum capacity for transmitting torsional forces and a plurality of discrete transverse elements for transmitting transverse and shear forces but not those torsion forces acting about the longitudinal axis of the petal. The base plate and discrete transverse elements are linked by guide elements running along the longitudinal edges of the base plate and by intermediate discrete transverse element fasteners.

20 Claims, 12 Drawing Sheets

DIVERGENT SLAVE PETAL FOR SEALING IN VARIABLE GEOMETRY EXHAUST NOZZLES FOR GAS TURBINE PROPULSION UNITS

BACKGROUND OF THE INVENTION

1. Field of the Invention

This invention relates to a slave petal for the divergent section of a variable geometry convergent-divergent exhaust nozzle for gas turbine propulsion units, used as the means of propulsion in aviation.

More specifically, the exhaust nozzle to which this invention refers is of the axisymmetric type, including a convergent section followed, in the direction of the flow, by a divergent section, both formed of master petals connected to each other by linkages, and slave petals also connected together by linkages. The convergent section defines a throat of variable area and the divergent section, also with variable geometry, can be actuated in order to vector the gas flow, and therefore the thrust, in any direction on a cone located around the longitudinal axis of the propulsion unit.

2. Description of Related Art

The maneuverability of aircraft is an essential factor. This maneuverability which to date has been achieved by aerodynamic forces, can be substantially improved by modifying the vectoring of the flow starting from its normal axial direction of action.

Vectoring of the gas flow has been done for many years in rocket engines. There, the systems are much simpler since the exhaust nozzles have constant geometry.

Variable geometry convergent-divergent exhaust nozzles are a relatively recent introduction in supersonic aircraft powered by turboreactor or turbofan engines.

In this class of exhaust nozzle, the vectoring of the flow is still not in an operational state but is only at the research or development phase. Those that are at a more advanced state are the bidimensional type, in which the flow is vectored solely in one plane.

Carrying out vectoring of the flow in exhaust nozzles with axial symmetry has a special advantage since the direction of the flow can then be varied in any axial plane, the pitch and yaw planes being particularly important.

Several patents exist on mechanisms for vectoring of the flow in this class of exhaust nozzle, since it is theoretically possible to carry this out in various ways, though it is very difficult to ensure that there are no major complications.

Vectoring only the divergent section of the exhaust nozzle, downstream of the throat area, has the advantage that the perturbations induced by the vectoring are not transmitted upstream of the propulsion unit and the sealing of the interstices on the different moving parts is simplified. Even so, the problem of the sealing between divergent master petals during vectoring of the flow remains. In this regard, U.S. Pat. No. 4,994,665 or Spanish Patent Application No. 9200369 teach different designs of exhaust nozzle in which only the divergent section, or part of it, respectively, is vectored.

With the aim of solving the sealing of the interstices between divergent master petals, there exists various solutions such as those described in U.S. Pat. Nos. 4,690,330; 4,662,566; 5,039,014; 5,076,496 and Spanish Patent Application No. 9200369.

The present invention describes and claims a divergent slave petal for sealing longitudinal interstices between contiguous divergent master petals, in addition to pointing out special advantages offered in comparison with other systems that have been the subject of previous patents.

The geometry of the longitudinal interstices between divergent master petals changes during vectoring of the flow, going from an approximately rectangular shape to that of a ruled surface whose sides cease to be parallel.

In U.S. Pat. Nos. 4,690,330 and 4,662,566, a divergent slave petal is formed from a plurality of overlapping segments welded together and to a longitudinal dorsal metal sheet in specific areas, in such a way that the effect of the temperature gradient between the surface in contact with the gases and the external surface of the slave petal is absorbed by allowing a certain relative movement between the segments.

In order to seal the longitudinal interstice between divergent master petals during vectoring of the flow, U.S. Pat. No. 5,039,014 describes another solution that consists of a dorsal bar on which is mounted a plurality of segments that can rotate around that bar. Although this solution solves the problem of sealing the interstice, the assembly of segments creates a wall of considerable roughness and with a multitude of ridges transverse to the direction of the flow.

U.S. Pat. No. 5,076,469 describes a divergent slave petal formed from a metal sealing sheet linked to a continuous support element in such a way that allows a certain relative movement between both in order to allow thermal differential movements.

Spanish Patent Application No. 9200369 claims an asymmetrical variable geometry vectoring exhaust nozzle for gas turbine propulsion units.

That exhaust nozzle includes a divergent section and a convergent section, both formed from master petals and slave petals, and which includes governing and external radial supports for regulating the throat area and a regulator for regulating the vectoring of the flow, characterized by the fact that the variation in the throat area and the vectoring of the flow is carried out by a single governing system.

This single governing system is made up of three annular pieces, concentric with each other and with the axis of the propulsion unit, and of a plurality of linear actuators linked by the upstream end to the structure of the propulsion unit.

These annular pieces are connected together and to the structure of the propulsion unit by linkage elements and guide devices, which allow the joint axial displacement of the three annular pieces by an equal amount with respect to the structure of the propulsion unit, as well as a relative rotary movement of the intermediate and external annular pieces between themselves and with respect to the internal annular piece in any direction, thereby allowing the external annular piece to be inclined in any direction, with the center of rotation in the axis of the propulsion unit.

The convergent master petals are each connected at the upstream end to the internal annular piece by tangential cylindrical linkages with an axis disposed perpendicular to the axis of the propulsion unit. The external annular piece is in turn connected by spherical linkages to the downstream end of the linear actuators mentioned above.

The mechanism for varying the throat area A8 includes a rod connected at one end, via a linkage, to the convergent master petal, while the other end is connected via another linkage to the fixed structure of the exhaust nozzle housing.

The master petals in the divergent section are transversely subdivided into two segments joined together by a cylindrical linkage with an axis disposed perpendicular to that of the linkage between master petals in the convergent and divergent sections, the downstream segment being joined to the external annular piece by a strut, which is connected to this segment via a spherical linkage and to the external annular piece via a tangential cylindrical linkage with an axis disposed perpendicular to that of the propulsion unit.

The upstream segment of the divergent master petal is connected at its upstream end to the corresponding convergent master petal via a tangential cylindrical linkage with an axis disposed perpendicular to the axis of the propulsion unit.

The external annular piece includes two half-ring segments interconnected with linkages and supported by four linear actuators.

This design, including two half-rings moved by four linear actuators, allows the outlet area A9 to be varied for a fixed value of the throat area A8.

In Spanish Patent Application No. 9200369 discussed above, the problem of sealing the interstice existing between contiguous divergent master petals is solved by providing slave petals which include a foldable plate provided with hinged linkages in each of it folds, the freedom of rotation of the linkage being limited but sufficient so that the different components of that plate can adapt themselves to the configuration of maximum distortion of the geometry of that interstice.

SUMMARY OF THE INVENTION

The present patent application is an improvement on Spanish Patent Application No. 9200369 from the same applicants, with regard to the slave petals in the divergent section during vectoring of the gas flow.

In the present invention, it is proposed to convert all the divergent slave petals into a deformable structural unit having minimum rigidity under torsion, and including a base plate and a plurality of discrete transverse elements inserted in that base plate. This base plate gives the assembly axial rigidity and is the element that bears the axial forces resulting from the gas flow, the cooling air, and inertial forces, but nevertheless having minimum capacity for transmitting transverse forces. For their part, the discrete transverse elements lack the capacity to transmit torsional forces and they transmit the transverse and shear forces imposed both by the gas flow and by the divergent master petals, to which is transmitted the gas pressure exerted on the base plate bearing the axial forces.

By its upstream end, the base plate bearing the axial forces transmits these axial forces to the downstream end of its corresponding convergent slave petal via a floating degenerate cylindrical linkage.

The base plate and the discrete transverse elements are connected by guide devices running along the longitudinal edges of that plate and by intermediate transverse fasteners, which are secured to the base plate between consecutive transverse elements.

The guide elements mentioned include channels which link the longitudinal edges of the base plate with the transverse edges of the discrete transverse elements, each of these channels including a wing parallel to the internal surface of the adjacent divergent master petal, this wing constituting the longitudinal seating of the deformable structural unit on the internal surface of the corresponding divergent master petal. This wing can be reinforced by an external rim for seating on the internal surface of the contiguous divergent master petal.

The channels can be obtained starting from the base plate by providing longitudinal folds formed in their longitudinal edges, or they can be created by profiles that clasp the longitudinal edges of the base plate and the transverse edges of the discrete transverse elements, giving rise to two designs of the divergent slave petals:

I) With longitudinal wings reinforced with a longitudinal rim and runners, forming an integral part of the base plate bearing the axial forces.

II) With longitudinal profiles reinforced with a longitudinal rim and divided into sections that do not form part of the base plate bearing the axial forces, each section instead being integral with just one of the discrete transverse elements.

The second of these designs has somewhat greater flexibility with regard to torsion compared with the first design.

When the gas pressure on the internal surface of the divergent slave petal is greater than the air pressure on its external surface, the base plate bearing the axial forces is seated on the discrete transverse elements, forcing them to work under flexion at the same time as the base plate locally flexes as it covers the small longitudinal spans existing between those elements.

The greater rigidity under transverse flexion shown by each of the discrete transverse elements with respect to that of the base plate bearing the axial forces is due mainly to the omega-shaped transverse cross-section that they have.

The thickness of the base plate bearing the axial forces is the minimum necessary for transmitting an axial force to its partner, the convergent slave petal, and at the same time bridging the spans existing between every two discrete transverse elements; in such a way that the set of base plates bearing the axial forces and the discrete transverse elements have the minimum rigidity possible under torsion, i.e., the maximum flexibility for being distorted without this causing destruction of the material due to fatigue.

For centering the divergent slave petal between contiguous divergent master petals, the corresponding centralizing mechanism is provided, and each divergent slave petal has hangers for supporting it on those contiguous divergent master petals.

Given that, in certain situations, the pressure of the gas on the internal surface of the divergent slave petal (exposed to the gases) can be less than the pressure of the air on the external surface, to increase the stability with regard to buckling caused by depression of that portion of the base plate bearing the axial forces between its longitudinal edges and the transverse hanger sections, longitudinal fasteners are fitted in the areas between every two consecutive discrete transverse elements, which hang from those discrete transverse elements, while these hang from the longitudinal edges of the base plate bearing the axial forces; and these longitudinal edges are in turn supported by the transverse hanger sections.

All the characteristics described above, as well as other features and advantages of the invention will be able to be better understood with the following description, made with reference to the attached diagrams, in which is shown one possible way of carrying out the invention, given by way of an example only rather than being restrictive.

BRIEF DESCRIPTION OF THE DRAWINGS

FIGS. 16 and 17 are similar views of those of FIGS. 11 and 12, respectively, showing an alternative design of the divergent slave petal.

DETAILED DESCRIPTION OF PREFERRED EMBODIMENTS OF THE INVENTION

Figure 1:
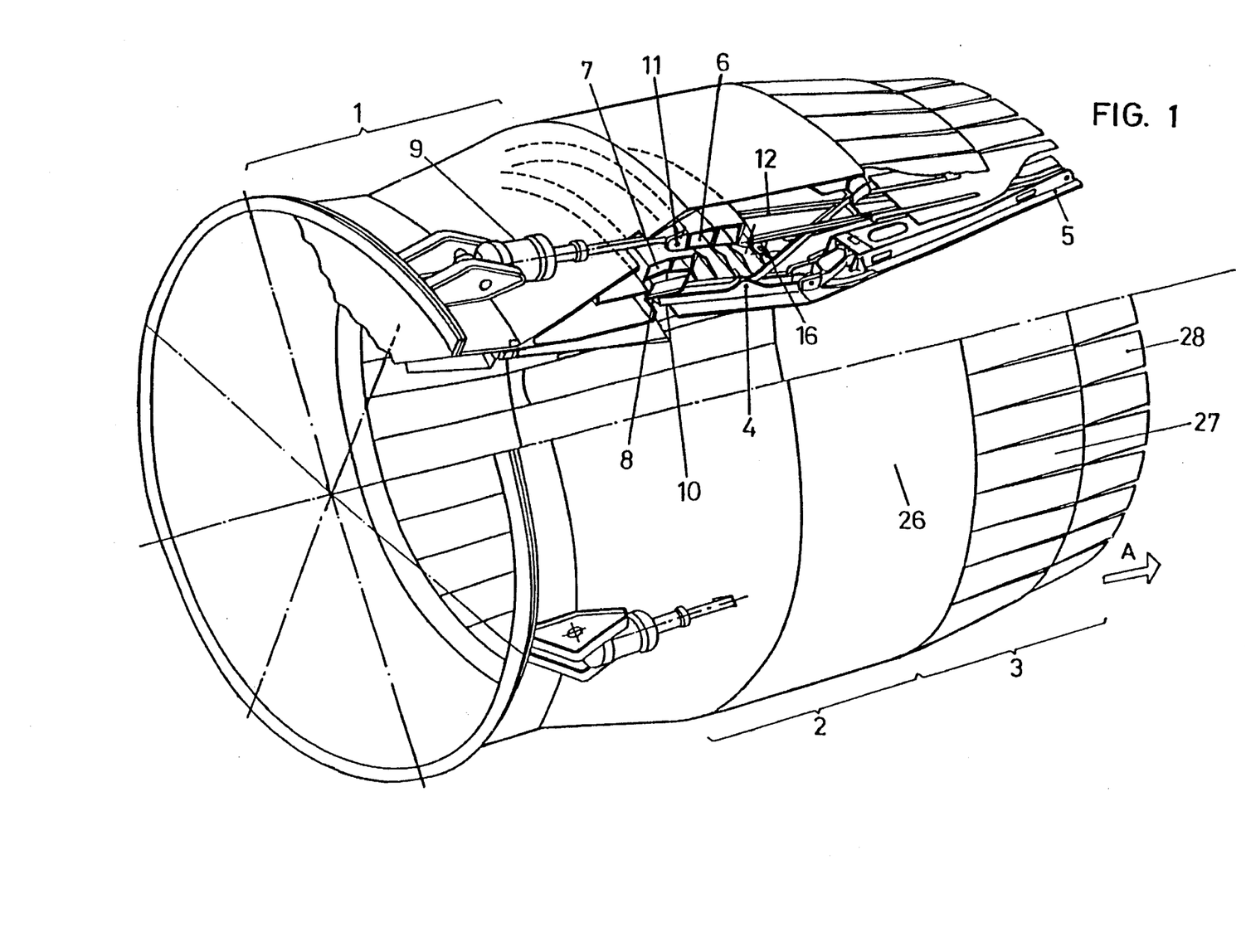
FIG. 1 is a perspective, partially cross-sectioned, view of a vectoring exhaust nozzle in accordance with one embodiment of the present invention.

In perspective and partially cross-sectioned diagrammatic form, FIG. 1 shows an exhaust nozzle created in accordance with the designs included in Spanish Patent Application No. 9200369, arrow A indicating the direction of the flow or circulation of the gases. As with transitional exhaust nozzles, the one shown in FIG. 1 includes a rear casing 1, a convergent section 2 and a divergent section 3. The convergent section 2 includes a plurality of master petals 4 and slave petals, which are not shown. In the same way, the divergent section 3 includes master petals 5 and slave petals, which are not shown. The exhaust nozzle also includes a governing system for the throat area A8, defined by the intersection between the convergent petals 4 and divergent petals 5, and for vectoring of the flow.

The variation of the throat area and the vectoring of the flow are done by a single governing system, which includes three annular pieces 6, 7 and 8 which are concentric with each other and with the axis of the propulsion unit, and of a plurality of linear actuators 9 that are linked at their upstream ends to the structure of the casing 1.

The convergent master petals 4 are connected at their upstream ends to the internal annular piece 8. This connection is made by tangential cylindrical linkages 10, having an axis disposed perpendicular to that of the propulsion unit.

Figure 2:
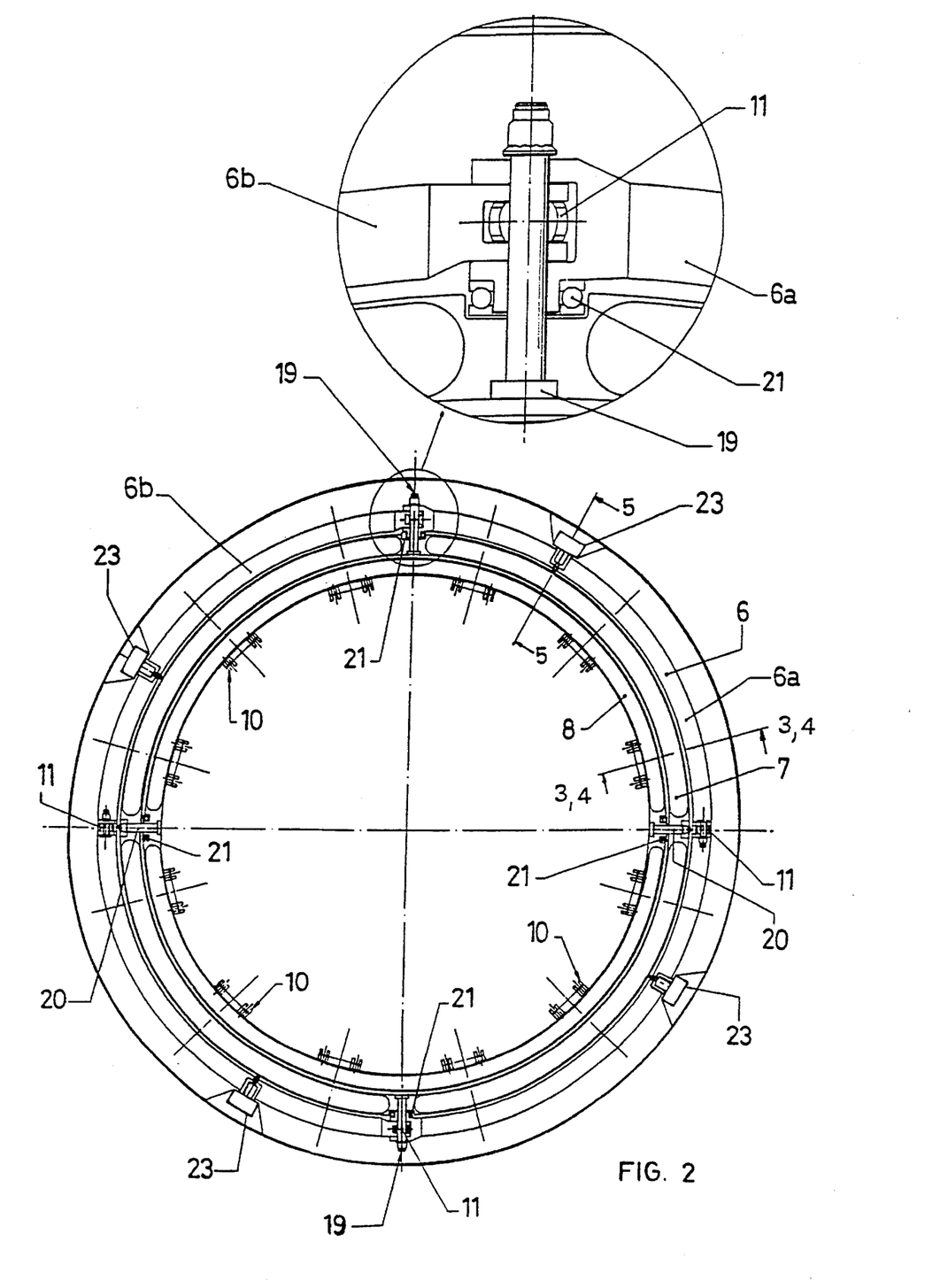
FIG. 2 is a transverse cross-section of the exhaust nozzle, along line 2—2 of FIG. 5, in order to show the linkages between the elements making up the simultaneous governing system of the throat area and of vectoring of the flow.

Connected to the external annular piece 6, via spherical linkages 11, shown in FIGS. 1 and 2, are the downstream ends of the linear actuators 9. Moreover, the external annular piece 6 is connected to the divergent master petals 5 by struts 12 mounted concentrically around the axis of the propulsion unit. The connection of each strut 12 to the external annular piece 6 is made by cylindrical linkage 13, while the connection to the divergent master petal 5 is made by a spherical linkage 14 (FIGS. 1 and 3).

Figure 3:
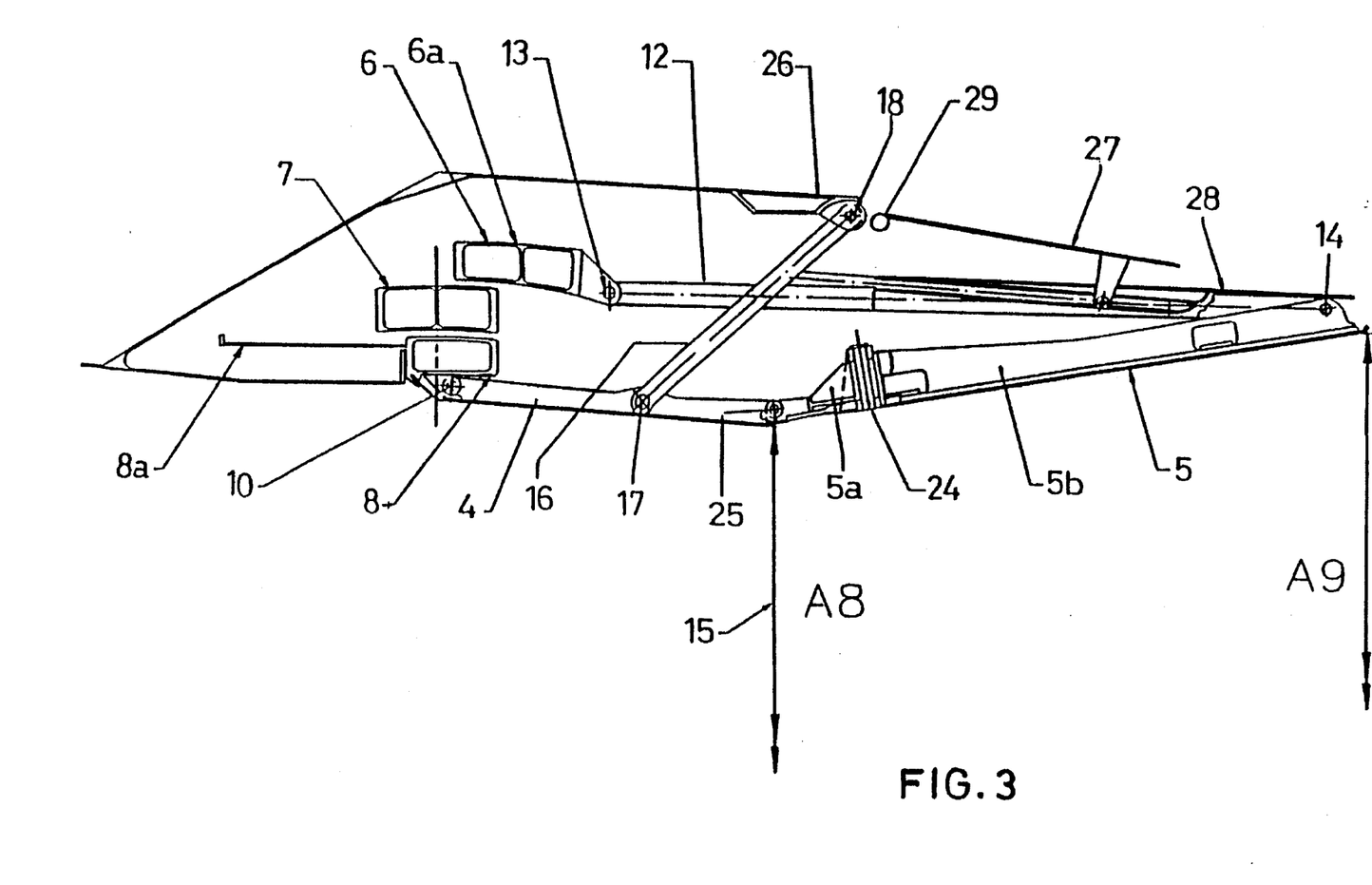
FIG. 3 is a longitudinal cross-section of the exhaust nozzle, along the line 3,4—3,4 of FIG. 2, showing the exhaust nozzle in the open position and without vectoring of the flow.

The governing system for the exhaust nozzle also includes a modification mechanism 15 of the throat area A8, which, as shown in FIG. 3, consists of a rod 16 connected at one end by a linkage 17 to the convergent master petal 4, while its opposite end is connected via a linkage 18 to the fixed structure of the exhaust nozzle housing.

The annular pieces 6, 7 and 8 are also linked together by devices that allow for axial displacement of the assembly of the three pieces, by an equal amount, with respect to the structure of the propulsion unit, as well as a relative rotatory movement of the intermediate annular piece 7 and external annular piece 6 between them and with respect to the internal annular piece 8, in such a way that it allows the external annular piece 6 to incline in any direction, with its center of rotation in the axis of the propulsion unit. In this way, the external and internal annular pieces 6 and 8 are, via the intermediate annular piece 7, allowed a relative rotational movement in space, thereby forming a spherical joint. For this, the annular pieces 6 and 7 are joined together by a cylindrical linkage defined by the shafts 19, shown in FIG. 2, aligned in a diametrically opposite position, while the annular pieces 7 and 8 are joined together by another cylindrical linkage defined by the shafts 20, shown in FIG. 2, also aligned together and in a diametrical position perpendicular to the shafts 19.

With the aim of reducing the clearances between the annular pieces 6, 7 and 8 and minimizing the friction between them during their relative rotation, certain axial thrust bearings 21 shown in FIG. 2, are provided concentrically with the shafts 19 and 20.

Figure 4:
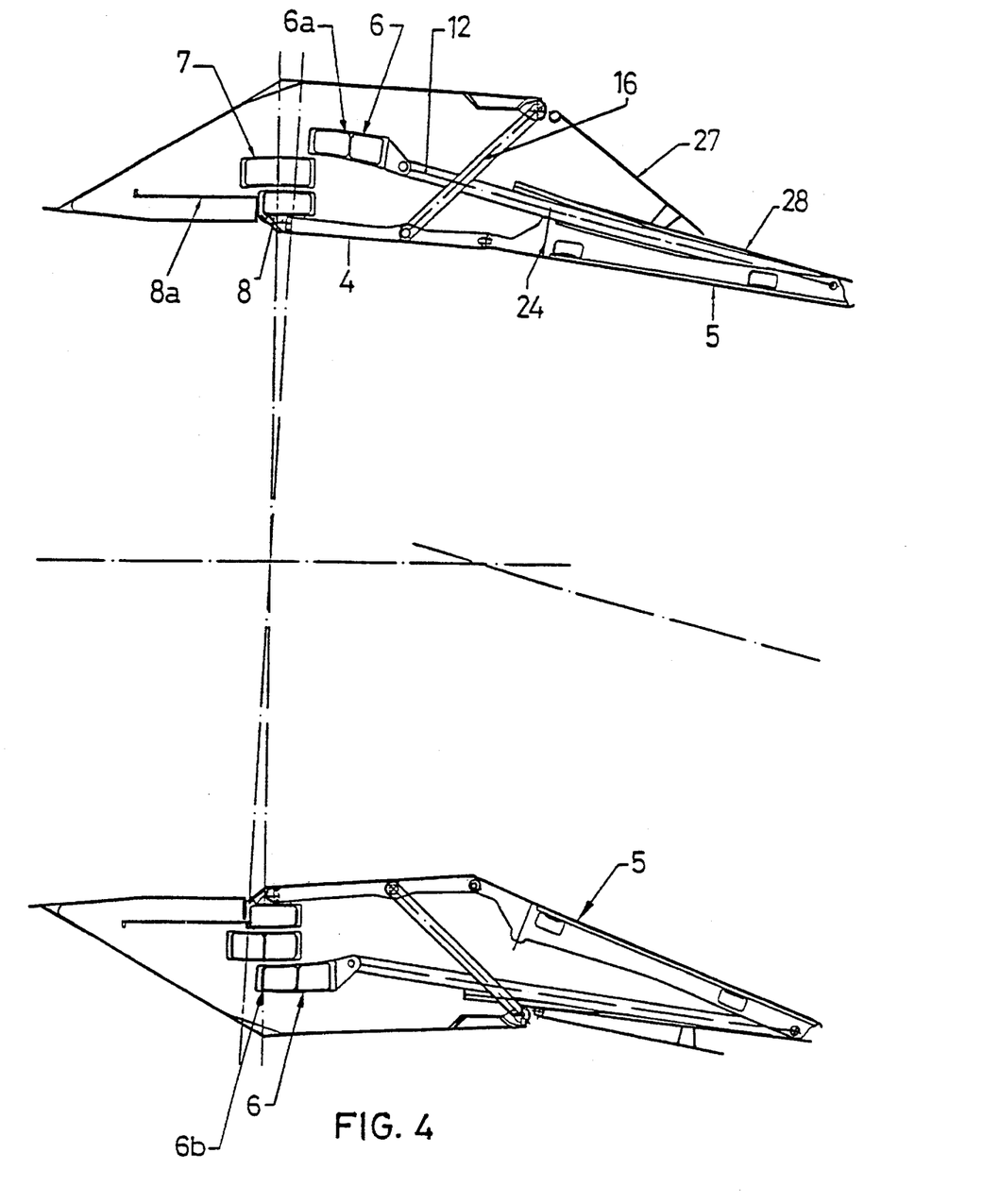
FIG. 4 is a longitudinal cross-section of the exhaust nozzle, along the line 3,4—3,4 of FIG. 2, with the exhaust nozzle in the open position and with vectoring of the flow.
Figure 5:
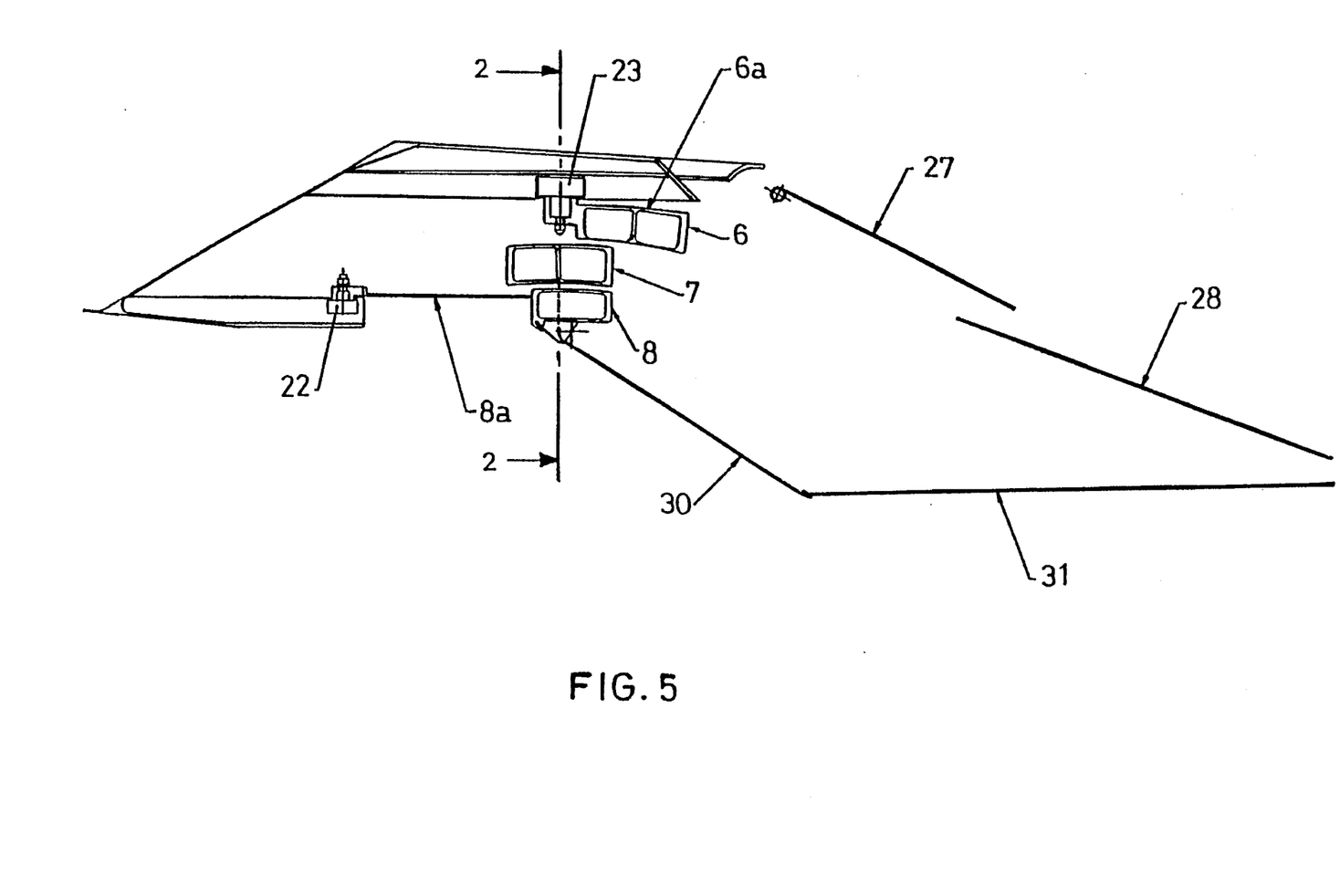
FIG. 5 is a longitudinal cross-section of the exhaust nozzle, along the line 5—5 of FIG. 2, with the exhaust nozzle in the closed position and without vectoring of the flow.

As can be seen in FIGS. 3 to 5, the annular piece 8 contains a cylindrical projection 8a, by which sealing of the post-combustor is achieved during regulation of the throat area 15 of the exhaust nozzle. The axis of this cylindrical projection must always be located on the longitudinal axis of the propulsion unit, for which it will have, outside the plane of the spherical joint, the rollers 22, shown in FIG. 5, which will move solely in the axial direction along the interior of certain guides fixed to the structure of the propulsion unit, in order to define the guide device of the annular piece 8.

For its part, the external annular piece 6 is guided by a device including rollers 23, shown in FIGS. 2 and 5, which can move solely in the axial direction along the interior of guides fixed to the structure and with a small clearance to allow the rotation of this annular piece 6 around any diameter. The guides for the annular pieces 6 and 8 will have to absorb the net shear forces that might appear during vectoring of the flow and those caused by asymmetries in the loads.

Via the activation in one or the other direction of the linear actuators 9, the arrangement described and represented in FIGS. 1 to 5 allows the following movements:

Axial movement of the assembly of annular pieces 6, 7 and 8 along with the struts 12 and the petals 4, allowing the throat area A8, referenced with number 15 in FIG. 3, to be varied. The displacement of the annular pieces 6, 7 and 8 by the action of the linear actuators 9 causes radial displacement of the convergent master petals 4 via the linkage 10. Because of the fixed structure and via the rod 16, these convergent master petals 4 are opened or closed in a radial direction, defining along with the struts 12 the position of the divergent master petals 5. In this case the linear actuators 9 will always have the same length.

Each of the actuators 9 can be lengthened or shortened in such a way that the external annular piece 6 moves on a theoretical spherical surface, with a center in the axis of the propulsion unit, the annular piece 8 remaining fixed in the axial position, and then achieving vectoring of the flow in any direction around the axis of the propulsion unit via the same mechanisms. In the activation indicated, the struts 12, which are connected via a cylindrical linkage 13 to the annular piece 6, rotate with this and force the divergent master petals 5 to move in the radial direction, a movement indicated with arrow R in FIG. 9, and in the tangential direction, a movement referenced with arrow T in FIG. 9, thereby allowing vectoring of the flow to be achieved in the direction indicated by arrow B. For this, each divergent master petal is subdivided into two segments, 5a and 5b, joined together by a cylindrical linkage 24 arranged in a direction perpendicular to the base of the petal, as can be better seen in FIGS. 3, 6 and 7. The element or segment 5a is joined to the master petal 4 by a cylindrical linkage 25. With this solution, the problem of sealing the throat area 15 is solved in the simplest way since, during vectoring of the flow, both segments 5a and 5b move in the radial direction, but the segment 5a is prevented from moving in the tangential direction, with only element 5b moving in that tangential direction. Vectoring of the gas flow, and therefore of the thrust, has indeed been achieved.

The annular piece 6 is divided diametrically into two half-rings, referenced with numbers 6a and 6b, connected together by the same elements that shape the cylindrical linkages 19, as can be seen in FIG. 2. The linear actuators 9 that are connected to these cylindrical linkages 19 will remain fixed in length, those that are secured to the midpoint of the half-rings 6a and 6b being shortened or lengthened by the same amount with the aim of varying the outlet area A9 of the exhaust nozzle for a given throat area A8, since the struts 12 open or close the divergent master petals 5.

The three possibilities of movement mentioned above can be carried out simultaneously, with the travel of the linear actuators 9 being suitably regulated.

FIG. 3 shows the exhaust nozzle in the open position and without vectoring of the flow, while FIG. 4 shows the same longitudinal cross-section of the exhaust nozzle but in the open position and with vectoring of the flow.

FIG. 5, which has the exhaust nozzle in the closed position and without vectoring of the flow, shows the bearings or rollers 22 and 23 that can be displaced along longitudinal guides for guiding the axial displacement of the annular pieces 6, 7 and 8.

Figure 6:
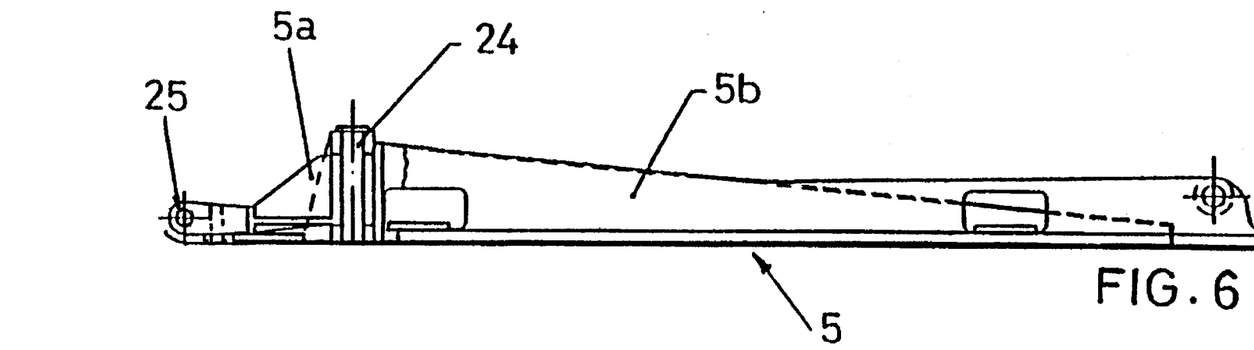
FIG. 6 is a side elevation view of a divergent master petal.
Figure 7:
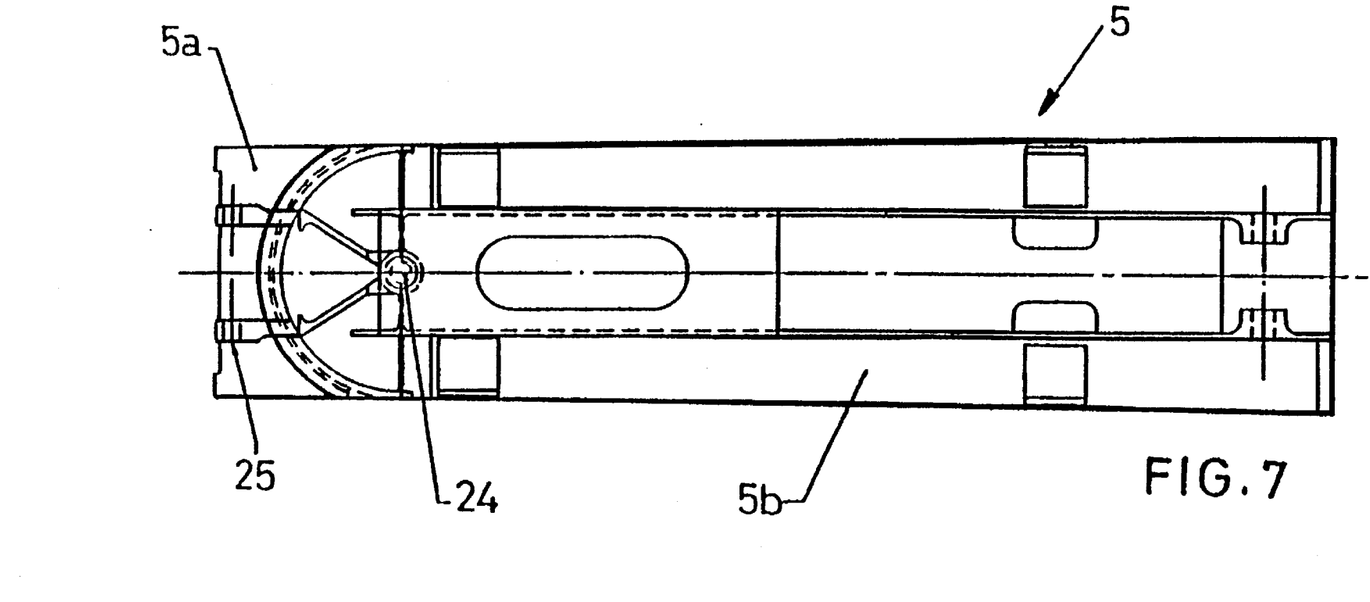
FIG. 7 is an external plan view of the divergent master petal of FIG. 6.

As already stated above, FIGS. 6 and 7 show one of the divergent master petals 5 in the plan and side elevation view.

As stated above, the sealing between convergent master petals and between the divergent master petals is done by the corresponding convergent and divergent slave petals 30 and 31, as shown in FIGS. 5 and 8 to 19.

Figure 8:
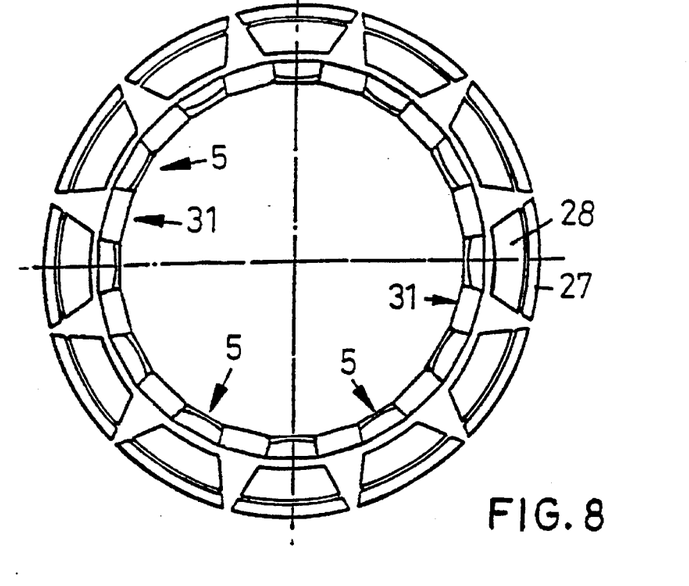
FIGS. 8 and 9 are rear views of the exhaust nozzle, without and with vectoring of the flow, respectively.
Figure 9:
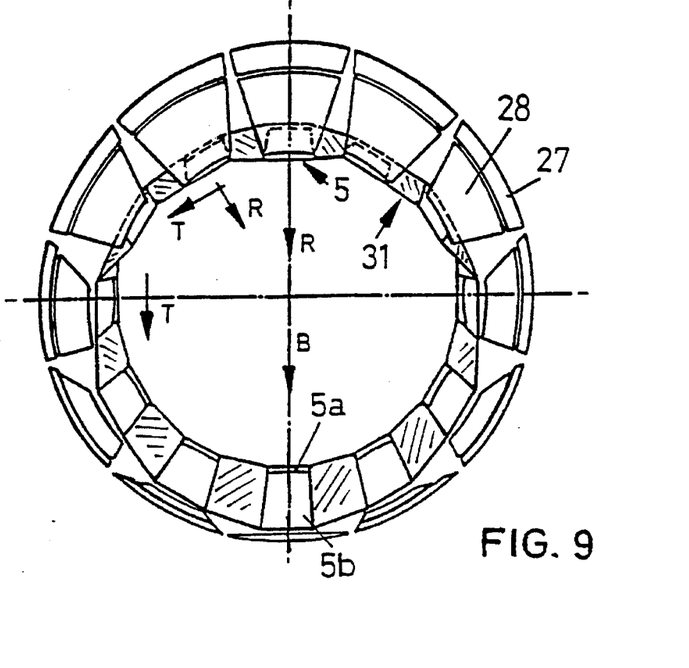
Figure 10:
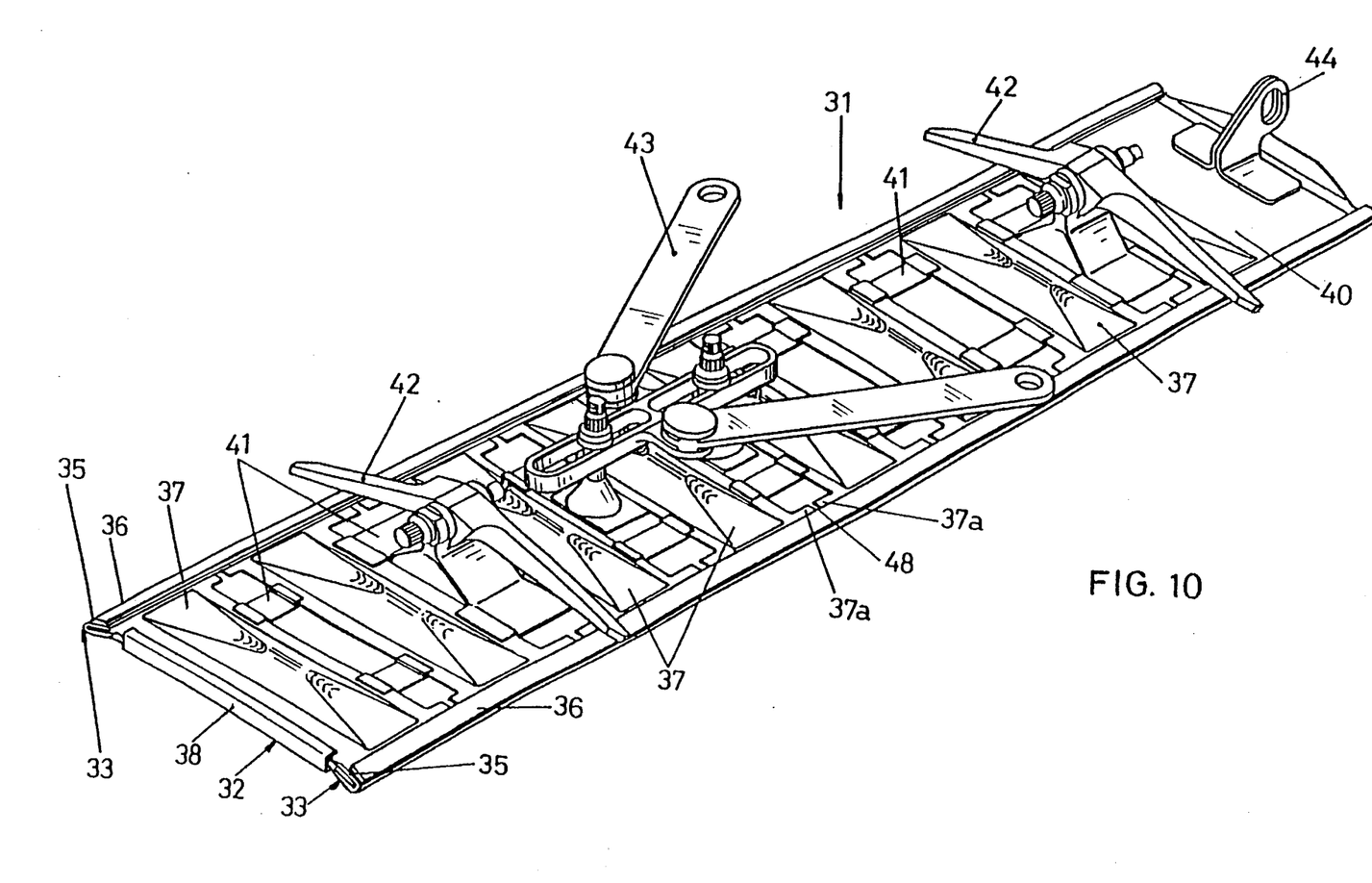
FIG. 10 is a rear perspective view of a divergent slave petal, designed in accordance with this invention.
Figure 11:
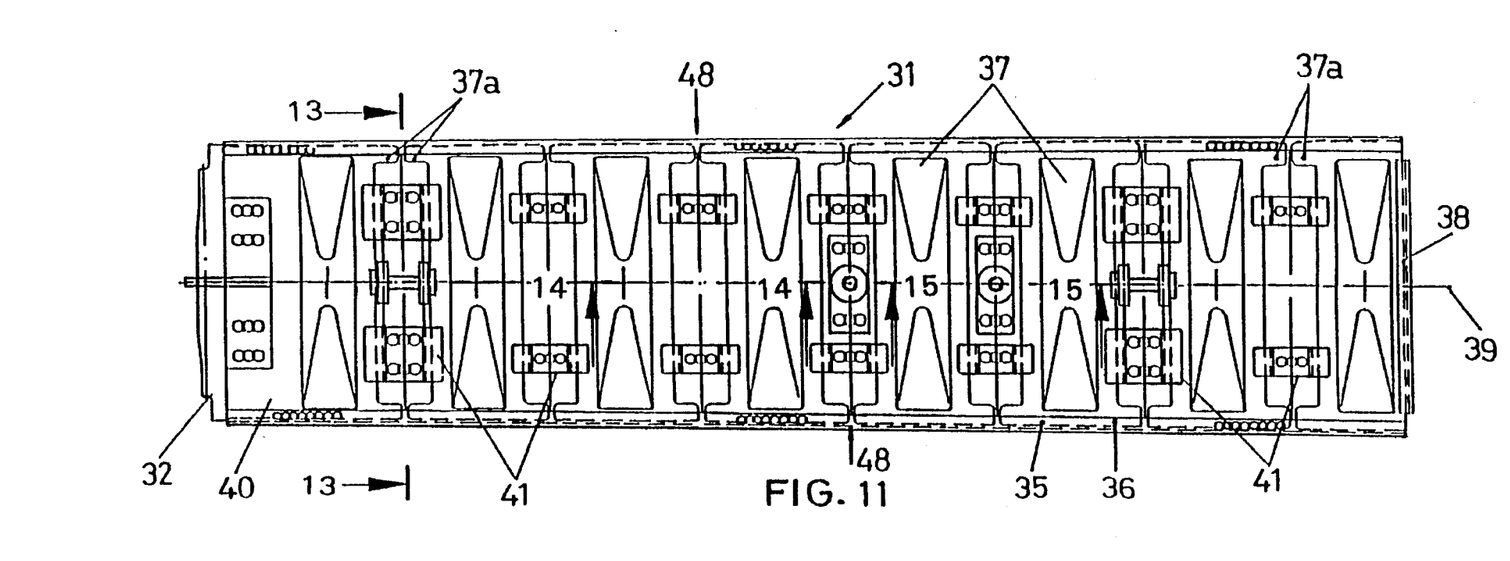
FIG. 11 is a plan view of the divergent slave petal of FIG. 10.
Figure 12:
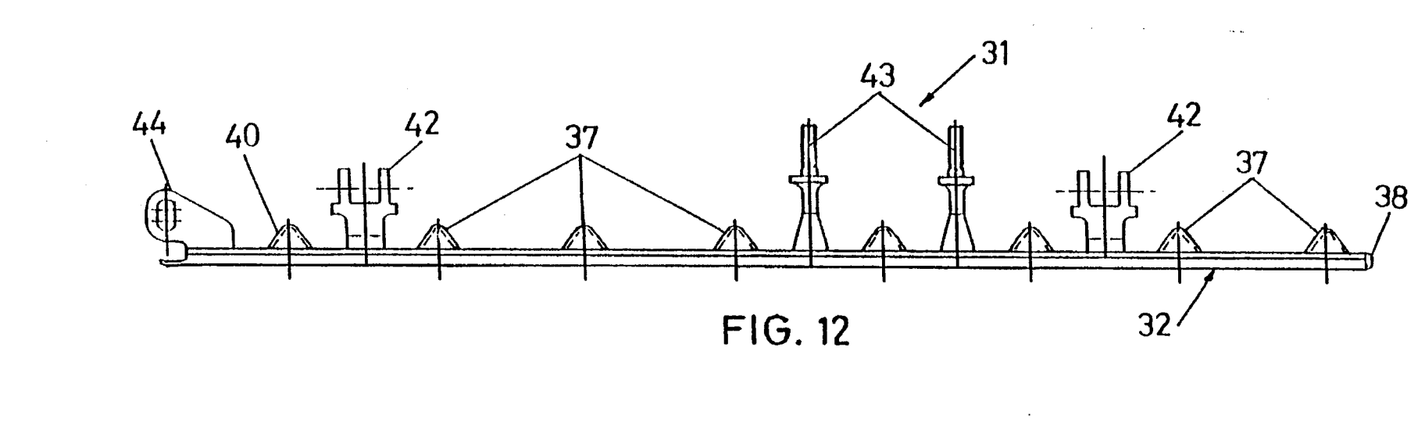
FIG. 12 is a side elevation view of the divergent slave petal of FIG. 10.
Figure 13:
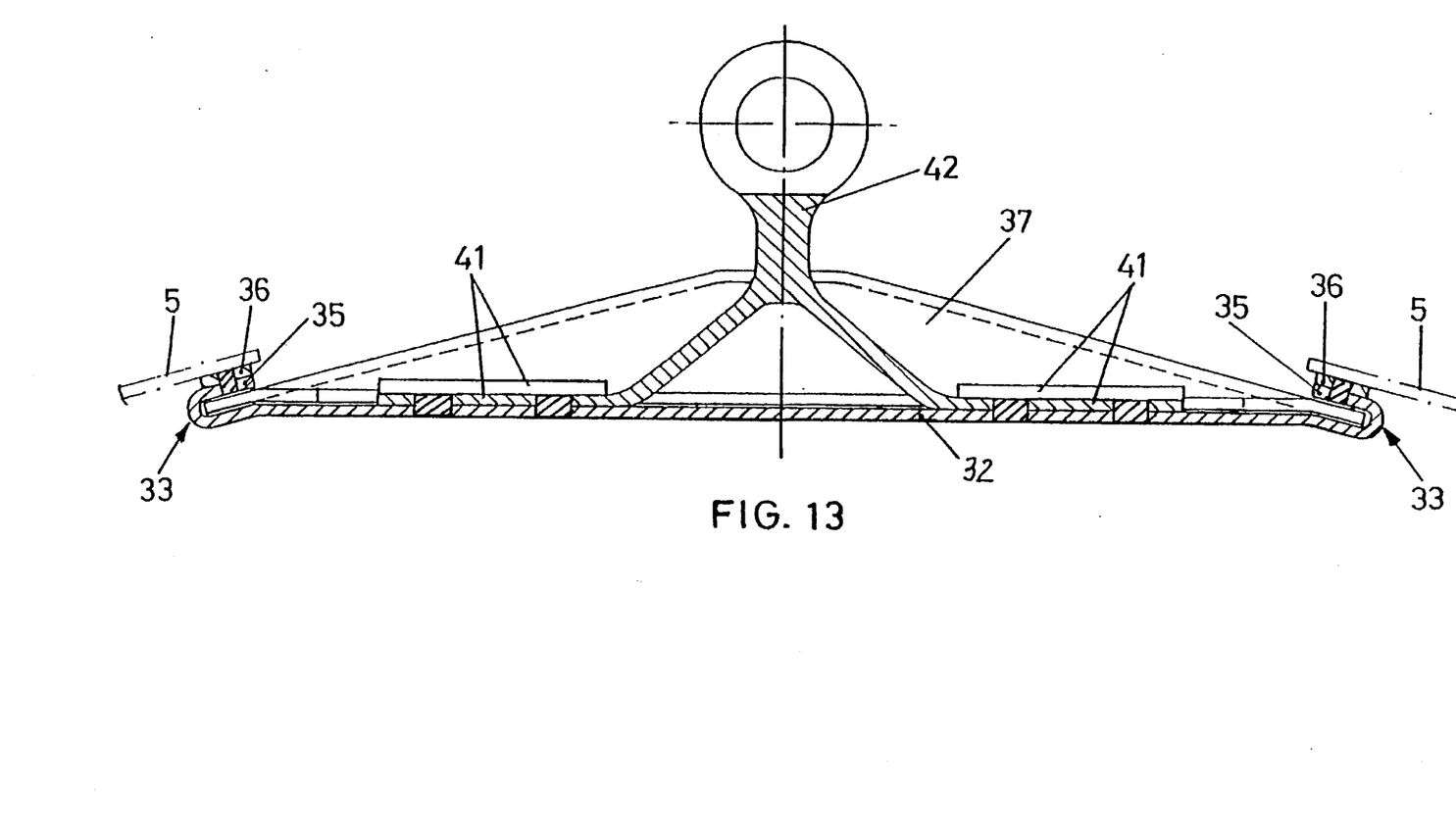
FIGS. 13, 14 and 15 are cross-sections, to a greater scale along the lines 13—13, 14—14 and 15—15 of FIG. 11, respectively.
Figure 14:
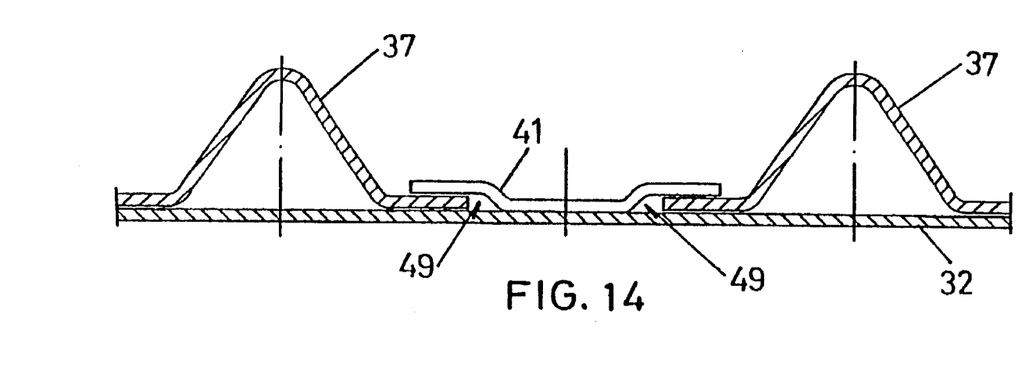
Figure 15:
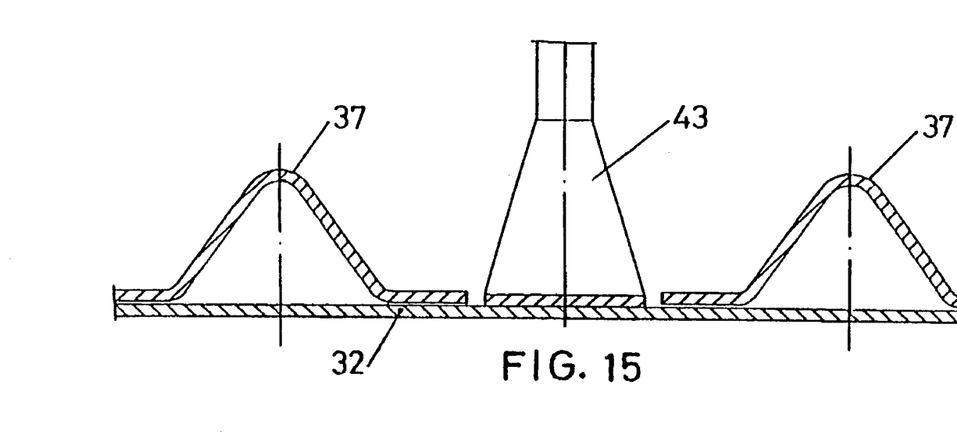
Figure 18:
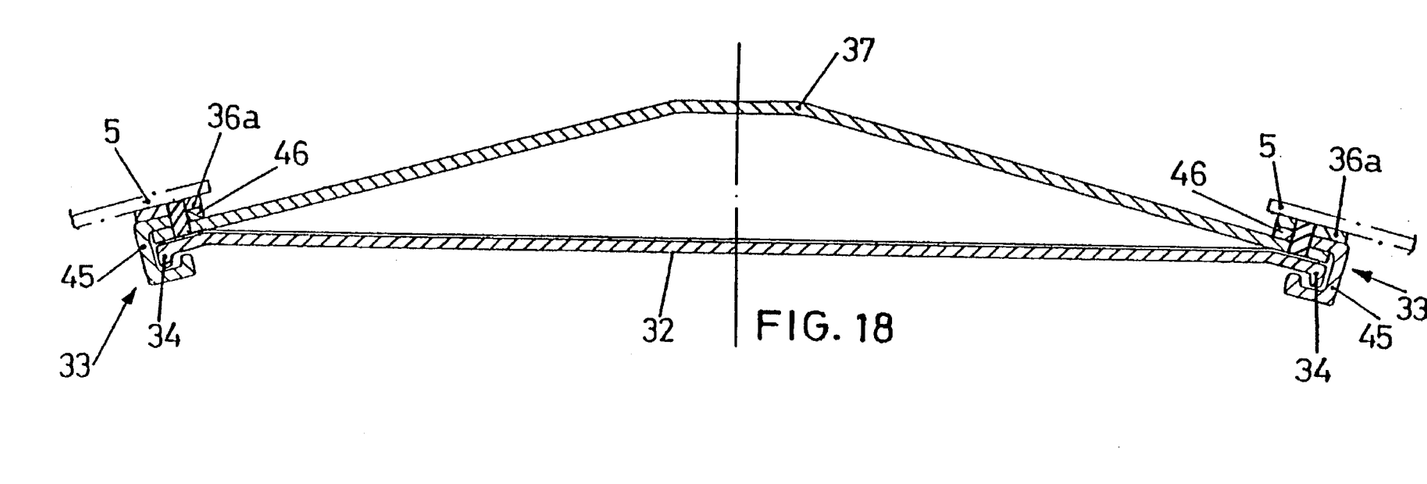
FIGS. 18 and 19 are cross-sections, to a greater scale, along the lines 18—18 and 19—19 of FIG. 16, respectively.
Figure 19:
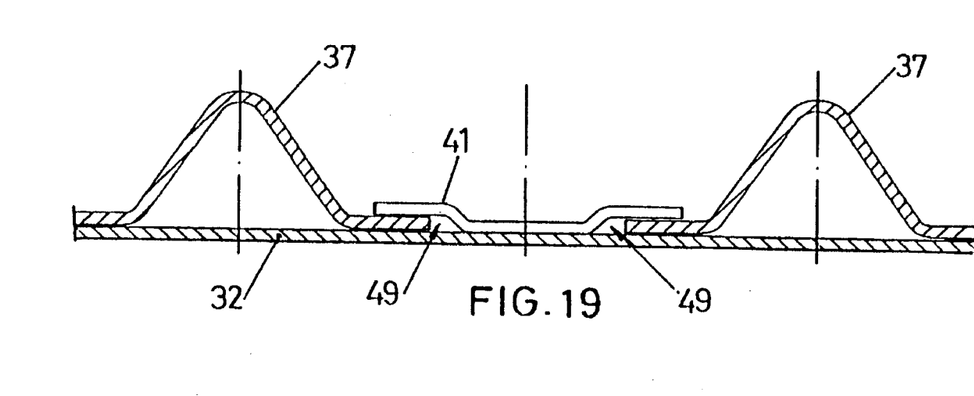

FIG. 8 is a rear view of the exhaust nozzle without vectoring, in which the sealing between divergent master petals 5 is done by the divergent slave petals 31 shown in FIGS. 10 to 19. FIG. 9 is a similar view to that of FIG. 8, with vectoring of the flow in the direction of arrow B.

Returning to FIG. 1, around the convergent section 2, the exhaust nozzle includes a cover 26, and around the divergent section, a cover made up of elements 27 and 28. As shown in FIGS. 3 to 5, the elements 27 are connected by spherical linkages 29 to the fixed structure and guided by the struts 12, while the elements 28 are connected to these struts 12.

In order to be adapted to the divergent master petals 5, including segments 5a and 5b, and to solve the problem of sealing the interstice existing between contiguous divergent master petals, this invention proposes a divergent slave petal 31 that constitutes a deformable structural assembly with minimum rigidity under torsion.

FIGS. 10 to 15 represent a design of this divergent slave petal 31. A base plate 32 bears the axial forces resulting from the flow of gas, the cooling air and inertial forces. In this design, each base plate 32 bearing the axial forces has at each of its longitudinal edges longitudinal folds extending in a direction opposite to the direction of folding, one on each side forming a channel 33 finished in a longitudinal wing 35 parallel to the internal surface of the contiguous divergent master petal 5 and forming a single element with the base plate 32 bearing the axial forces. The longitudinal wing 35 can be reinforced with a rim 36, also longitudinal, for seating on the internal surface of the contiguous divergent master petal 5. The base plate 32 bearing the axial forces also has a transverse closure lip 38 in its free transverse edge.

An assembly of discrete transverse elements 37 transmit the transverse and shear forces imposed both by the gas flow and by the movements of the contiguous divergent master petals 5. The elements 37 have no capacity at all for transmitting torsional movements around the longitudinal axis 39 of that divergent slave petal, since they allow a certain relative movement between them and with the base plate 32 bearing the axial forces.

An extreme discrete transverse element 40 for connection with the convergent slave petal is welded to the upstream end of the base plate 32 bearing the axial forces.

A set of fasteners 41 link the base plate 32 bearing the axial forces with the discrete transverse elements 37, allowing relative movement between them.

Support and guiding systems are provided and include hangers 42 that will rest on the divergent master petals 5, a centralizing mechanism 43 and a sliding degenerate cylindrical linkage 44 for connecting the divergent slave petal 31 to the corresponding convergent slave petal 30.

All these support and guiding systems 42, 43 and 44 are connected to the base plate 32 bearing the axial forces.

These support and guiding systems 42, 43 and 44 are shown by way of example, and it is possible to use other systems (e.g., a duplicated centralizing mechanism 43 instead of the sliding degenerate cylindrical linkage 44). The sliding degenerate cylindrical linkage 44 allows the divergent slave petal 31 to be seated on the internal surface of contiguous divergent master petals 5 and also allows the whole divergent slave petal 31 to rotate through a certain angle in any direction with its center in the sliding degenerate cylindrical linkage 44, with the divergent slave petal 31 adopting the positions that are imposed on it by the contiguous divergent master petals 5 via the centralizing mechanism 43. This sliding degenerate cylindrical linkage is used in axisymmetric convergent-divergent exhaust nozzles with conventional (non-vectoring) variable geometry currently under development or in operation.

Given that no material continuity exists between the discrete transverse elements 37 and the base plate 32 bearing the axial forces, nor between contiguous discrete transverse elements 37, the presence of thermal gradients, both longitudinal and transverse does not generate any thermal force in the divergent slave petal 31, since nothing hinders the thermal expansion movements of the base plate 32 bearing the axial forces nor those of each of the discrete transverse elements.

Moreover, given that the thickness of the base plate 32 bearing the axial forces is the minimum necessary for transmitting the axial forces (of small magnitude) to the corresponding convergent slave petal 30 and, in turn, bridging the spans existing between every two discrete transverse elements 37 or 37 and 40 (when the pressure on the internal surface of the divergent slave petal 31 is greater than the pressure on its external surface) the divergent slave petal 31 constitutes an assembly with low rigidity and resistance to torsion since the discrete transverse elements 37 cannot transmit the torsion. In this way, the divergent slave petal 31 has great flexibility for being distorted while covering the interstice between contiguous divergent master petals 5 during vectoring of the flow without this leading to destruction of the material caused by fatigue. Thus, the service life of the petal is thereby extended.

When the pressure on the internal surface of the divergent slave petal 31 is greater than the pressure on its external surface, the base plate 32 bearing the axial forces is seated in its longitudinal central section on the discrete transverse elements 37, forcing them to work under flexion and transmitting the forces to the contiguous divergent master petals 5 via the longitudinal wings 35 and longitudinal rims 36.

When the pressure on the internal surface of the divergent slave petal 31 is less than the pressure on its external surface (the order of magnitude of this pressure difference is small with respect to the pressure difference, with opposite sign, in normal operation) the divergent slave petal 31 is supported completely by the contiguous divergent master petals 5 via the hangers 42. Also, the stability of the base plate 32 bearing the axial forces with regard to the buckling is assured by the rigidity given to it by its longitudinal edges, on the one hand, the transverse sections reinforced by the hangers 42 and, on the other, the longitudinal folds that shape the channels 33, which are also hung from these reinforced transverse sections; and also by the fasteners 41 from which hang the base plate 32 of the discrete transverse elements 37 which, in turn, will also be hanging from the channels 33.

The channels 33, the longitudinal wings 35, the transverse closure lip 38, the extreme discrete transverse element 40 and the fasteners 41 prevent torsion from causing the dismembering of the deformable structural assembly with minimum rigidity which constitutes the divergent slave petal 31.

In the design shown in FIGS. 16 to 19, the longitudinal edges of the base plate 32 are finished in a rib 34 directed towards the side opposite to that occupied by the discrete transverse elements 37. The channels 33 are created by profiles 45 which clasp the longitudinal edges of the base plate 32, with its ribs 34, and the transverse edges of the discrete transverse elements 37. The external wing 46 of the profiles 45 is reinforced, as in the above case, by an external rim 36a. Both the profiles 45 and the rim 36a are divided into sections, each of which is integral with just one of the discrete transverse elements 37 and overlaps one or several contiguous discrete transverse elements 37.

FIGS. 16 to 19 show a preferred design, including arranging the whole of the interstice 47 between contiguous sections of longitudinal profile 45 and longitudinal rim 36a in such a way that it does not coincide with the separation interstice 48 between discrete transverse elements 37.

FIGS. 10 to 15 show a design in which the relative axial movement between the different discrete transverse elements 37, on the one hand, and between these elements 37 and the base plate 32 bearing the axial forces, on the other hand, is restricted by some appendages 37a which are integral with those discrete transverse elements 37–40, and are located at their two ends, in such a way that the interstice 48 between the appendages 37a is less than the interstice 49 between discrete transverse elements 37 and fasteners 41. This configuration is applicable both to the design of the longitudinal wings and rims shown in FIGS. 10 to 15 and to that shown in FIGS. 16 to 19; the same as the design shown in FIGS. 16 to 19, in which the discrete transverse elements 37 and 40 do not have the appendages 37a, the axial movement between them and with respect to the base plate bearing the axial forces being restricted by the fasteners 41.

In FIGS. 10 to 19, the support element for the hanger 42 and the fasteners 41 located in the same transverse section of the divergent slave petal 31 has been designed as a single piece.

In the design shown in FIGS. 10 to 19, the extreme discrete transverse element 40 is welded at its upstream end to the upstream end of the base plate 32 bearing the axial forces, it being also feasible to provide a lip similar to the transverse closure lip 38 at that upstream end, with which the discrete transverse element 40 would not be directly linked to the base plate 32 bearing the axial forces (allowing a certain relative movement between them).

It is clear that for any of the designs described, the longitudinal rims 36 and 36a can be eliminated, resting the divergent slave petal 31 directly on the contiguous divergent master petals 5 via the longitudinal wings 35 or 46.

The characteristics described allow the following advantages to be obtained:

A divergent slave petal in which the presence of thermal gradients does not generate any thermal force.

The thermal expansion of the longitudinal element is not hindered by any other element.

A divergent slave petal with the capacity for being torsioned and accommodating itself to the contiguous divergent master petals during vectoring of the gas flow in an axisymmetric convergent-divergent exhaust nozzle that only vectors the divergent section.

A petal including repetitive elements that are easy to manufacture.

We claim:

1. Divergent slave petal for sealing in variable geometry exhaust nozzles for gas turbine propulsion units, the divergent slave petal comprising:

a base plate having longitudinal edges, the base plate being formed to absorb forces acting along a longitudinal axis of the divergent slave petal and to transmit substantially no torsional forces acting about the longitudinal axis of the divergent slave petal;

a plurality of discrete transverse elements which are transverse to the longitudinal axis of the divergent slave petal and have transverse edges which are parallel to the longitudinal axis of the divergent slave petal, the discrete transverse elements being formed to transmit transverse and shear forces but not torsion forces which act about the longitudinal axis of the divergent slave petal;

a plurality of guide elements for linking the base plate and the discrete transverse elements, the guide elements extending along the longitudinal edges of the base plate;

a plurality of intermediate discrete transverse element fasteners secured to the base plate between consecutive transverse elements, the guide elements and the intermediate discrete transverse element fasteners being arranged to allow relative freedom of movement between the base plate and the discrete transverse elements.

2. Divergent slave petal according to claim 1, further comprising a plurality of appendages for restricting relative freedom of movement between the base plate and the discrete transverse elements.

3. Divergent slave petal according to claim 1, wherein the base plate and discrete transverse elements are supported on a plurality of fasteners and a plurality of hangers such that the fasteners and the hangers restrict relative freedom of movement between the base plate and the discrete transverse elements.

4. Divergent slave petal according to claim 1, wherein the guide elements comprise a plurality of channels linking the longitudinal edges of the base plate and the transverse edges of the discrete transverse elements and the base plate includes seatings located on and extending along the longitudinal edges of the base plate for supporting the base plate on an adjacent divergent master petal, each of the seatings comprising a wing disposed parallel to an adjacent divergent master petal, each of the channels being connected to one of said wings.

5. Divergent slave petal according to claim 4, wherein the channels are continuous along a length of the divergent slave petal and are formed along the longitudinal edges of the base plate.

6. Divergent slave petal according to claim 4, further comprising external longitudinal rims located on each wing and subdivided into sections coincident with the sections of the profiles for reinforcing the wing.

7. Divergent slave petal according to claim 4, wherein the channels comprise profiles that clasp the longitudinal edges of the base plate to the transverse edges of the discrete transverse elements, the profiles being subdivided into sections, each of the profile sections being integral with only one of the discrete transverse elements, the base plate having a rib disposed on a side opposite of the discrete transverse elements.

8. Divergent slave petal according to claim 7, wherein the discrete transverse elements are arranged to have interstices located between Consecutive discrete transverse elements and the sections of the profiles are arranged to have interstices located between consecutive sections of the profiles, the interstices located between the sections of the profiles being longitudinally out of phase with respect to the interstices existing between consecutive discrete transverse elements.

9. Divergent slave petal according to claim 4, further comprising an external longitudinal rim located on each wing for reinforcing the wing.

10. Divergent slave petal according to claim 9, wherein the rim is subdivided in a direction transverse to the longitudinal axis of the divergent slave petal into consecutive sections.

11. A variable geometry exhaust nozzle for a gas turbine propulsion unit, the exhaust nozzle comprising:
    a) a plurality of convergent master petals;
    b) a plurality of divergent master petals connected to the plurality of convergent master petals;
    c) a plurality of divergent slave petals connected to the plurality of divergent master petals for sealing spaces located between the divergent master petals, each of the divergent slave petals comprising a deformable structural assembly including:
    1) a base plate for absorbing forces acting along a longitudinal axis of the divergent slave petal and for transmitting substantially no torsional forces acting about the longitudinal axis of the divergent slave petal, the base plate having longitudinal edges;
    2) a plurality of discrete transverse elements which are transverse to the longitudinal axis of the divergent slave petal for transmitting transverse and shear forces but not torsion forces which act about the longitudinal axis of the divergent slave petal, each of the discrete transverse elements having transverse edges which are parallel to the longitudinal axis of the divergent slave petal;
    3) a plurality of guide elements for linking the base plate and discrete transverse elements, the guide elements extending along the longitudinal edges of the base plate;
    4) a plurality of intermediate discrete transverse element fasteners secured to the base plate between consecutive transverse elements, the guide elements and the intermediate discrete transverse element fasteners being arranged to allow relative freedom of movement between the base plate and the discrete transverse elements.

12. The exhaust nozzle of claim 11, further comprising a plurality of appendages for restricting relative freedom of movement between the base plate and the discrete transverse elements.

13. The exhaust nozzle of claim 11, wherein the base plate and discrete transverse elements are supported on a plurality of fasteners and a plurality of hangers such that the fasteners and the hangers restrict relative freedom of movement between the base plate and the discrete transverse elements.

14. The exhaust nozzle of claim 11, wherein the guide elements comprise a plurality of channels linking the longitudinal edges of the base plate and the transverse edges of the discrete transverse elements and the base plate includes seatings located on and extending along the longitudinal edges of the base plate for supporting the base plate on the adjacent divergent master petals, each of the seatings comprising a wing disposed parallel to an adjacent divergent master petal, each of the channels being connected to one of said wings.

15. The exhaust nozzle of claim 14, wherein the channels are continuous along a length of the divergent slave petal and are formed along the longitudinal edges of the base plate.

16. The exhaust nozzle of claim 14, further comprising external longitudinal rims located on each wing and subdivided into sections coincident with the sections of the profiles for reinforcing the wing.

17. The exhaust nozzle of claim 14, wherein the channels comprise profiles that clasp the longitudinal edges of the base plate to the transverse edges of the discrete transverse elements, the profile sections being subdivided into sections, each of the profiles being integral with only one of the discrete transverse elements, the base plate having a rib extending away from the discrete transverse elements.

18. The exhaust nozzle of claim 17, wherein the discrete transverse elements are arranged to have interstices located between consecutive discrete transverse elements and the sections of the profiles are arranged to have interstices located between consecutive sections of the profiles, the interstices located between the sections of the profiles being longitudinally out of phase with respect to the interstices existing between consecutive discrete transverse elements.

19. The exhaust nozzle of claim 14, further comprising an external longitudinal rim located on the wing for reinforcing each wing.

20. The exhaust nozzle of claim 19, wherein the rim is subdivided in a direction transverse to the longitudinal axis of the divergent slave petal into consecutive sections.

* * * * *